US011111904B2

(12) United States Patent
Christiansen et al.

(10) Patent No.: US 11,111,904 B2
(45) Date of Patent: Sep. 7, 2021

(54) WIND TURBINE BLADE AND A WIND TURBINE

(71) Applicant: Siemens Gamesa Renewable Energy A/S, Brande (DK)

(72) Inventors: Thomas Lehrmann Christiansen, Aalborg (DK); Donato Girolamo, Molinara (IT)

(73) Assignee: SIEMENS GAMESA RENEWABLE ENERGY A/S

( * ) Notice: Subject to any disclaimer, the term of this patent is extended or adjusted under 35 U.S.C. 154(b) by 136 days.

(21) Appl. No.: 16/508,381

(22) Filed: Jul. 11, 2019

(65) Prior Publication Data

US 2020/0025178 A1 Jan. 23, 2020

(30) Foreign Application Priority Data

Jul. 17, 2018 (EP) ..................................... 18183962

(51) Int. Cl.
*F03D 80/30* (2016.01)
*F03D 1/06* (2006.01)

(52) U.S. Cl.
CPC ........... *F03D 80/30* (2016.05); *F03D 1/0675* (2013.01); *F05B 2250/314* (2013.01);
(Continued)

(58) Field of Classification Search
CPC .... F01D 80/30; B64D 45/02; H02G 13/00–80
See application file for complete search history.

(56) References Cited

U.S. PATENT DOCUMENTS 7,494,324 B2 * 2/2009 Hibbard ................. H02G 13/00
416/230
10,066,599 B2 * 9/2018 Ohlerich ................. B29C 43/56
(Continued)

FOREIGN PATENT DOCUMENTS

EP 2930010 A1 10/2015
EP 2930355 A1 10/2015
(Continued)

OTHER PUBLICATIONS

Non-English Chinese Office Action for Application No. 201910646032.1, dated Oct. 10, 2020.
(Continued)

*Primary Examiner* — Igor Kershteyn
*Assistant Examiner* — Topaz L. Elliott
(74) *Attorney, Agent, or Firm* — Schmeiser, Olsen & Watts LLP

(57) ABSTRACT

Provided is a wind turbine blade for a wind turbine, the wind turbine blade including a support element having first fibers being electrically conductive, and a fiber material having second fibers being electrically conductive, wherein the fiber material has a free portion and an overlapping portion which is at least partially attached and electrically connected to the support element, wherein an extension direction of the second fibers changes along an extension path of the second fibers, wherein a first angle is provided between the second fibers in the overlapping portion and the first fibers, wherein a second angle is provided between the second fibers in the free portion and the first fibers, and wherein the second angle is larger than the first angle.

16 Claims, 5 Drawing Sheets

(52) U.S. Cl.
CPC . *F05B 2250/324* (2013.01); *F05B 2280/2006* (2013.01); *F05B 2280/6003* (2013.01)

(56) References Cited

U.S. PATENT DOCUMENTS

| | | | | |
|---|---|---|---|---|
| 2006/0280613 | A1* | 12/2006 | Hansen | H02G 13/80 |
| | | | | 416/230 |
| 2007/0074892 | A1* | 4/2007 | Hibbard | H02G 13/80 |
| | | | | 174/117 FF |
| 2008/0073098 | A1 | 3/2008 | Llorente Gonzalez et al. | |
| 2012/0134826 | A1 | 5/2012 | Arocena De La Rua et al. | |
| 2012/0163990 | A1* | 6/2012 | Shimono | B32B 27/12 |
| | | | | 416/244 R |
| 2015/0292479 | A1* | 10/2015 | Ohlerich | B29C 70/882 |
| | | | | 416/226 |
| 2016/0327028 | A1 | 11/2016 | March Nomen et al. | |
| 2019/0145383 | A1* | 5/2019 | Christiansen | F03D 80/30 |
| | | | | 416/146 R |
| 2019/0211806 | A1* | 7/2019 | Girolamo | F03D 1/0675 |
| 2019/0353143 | A1* | 11/2019 | Girolamo | B29D 99/0028 |
| 2020/0018284 | A1* | 1/2020 | Christiansen | F03D 1/0675 |
| 2020/0198264 | A1* | 6/2020 | Christiansen | B30B 5/02 |

FOREIGN PATENT DOCUMENTS

| | | |
|---|---|---|
| EP | 3511560 A1 | 7/2019 |
| WO | 2005050808 A1 | 6/2005 |

OTHER PUBLICATIONS

European Search Report for Application No. 18183962.2, dated Jan. 31, 2019.

\* cited by examiner

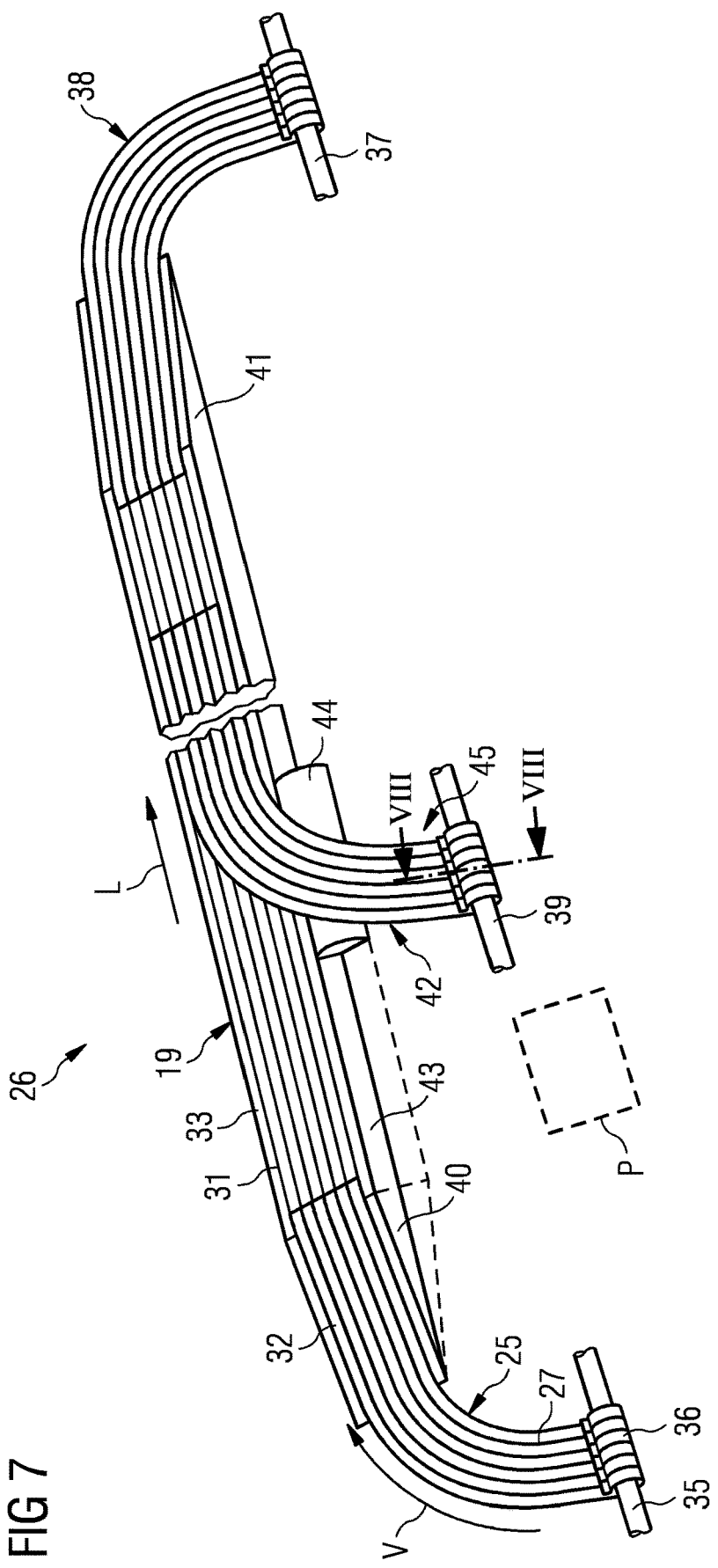

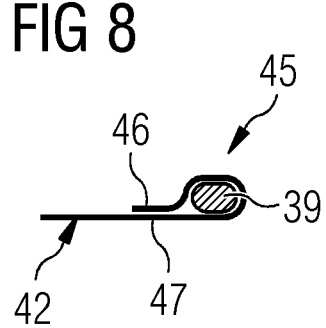
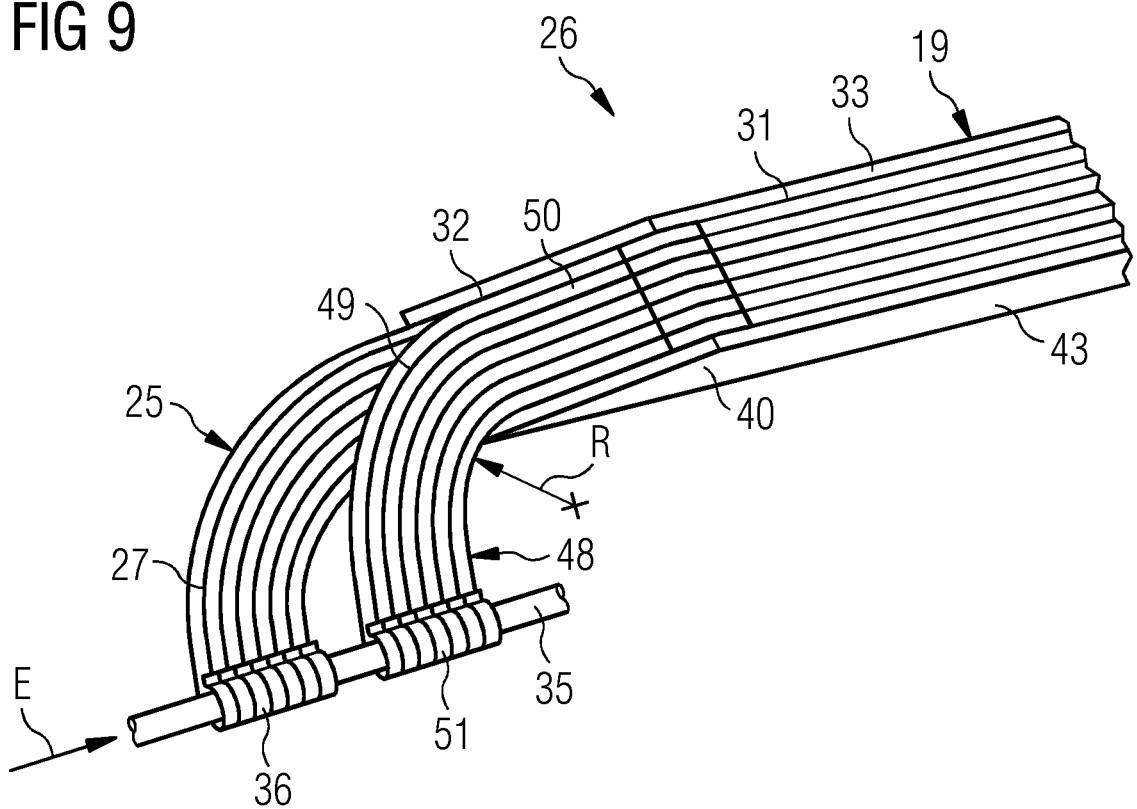

WIND TURBINE BLADE AND A WIND TURBINE

CROSS-REFERENCE TO RELATED APPLICATIONS

This application claims priority to EP Application No. 18183962.2, having a filing date of Jul. 17, 2018, the entire contents of which are hereby incorporated by reference.

FIELD OF TECHNOLOGY

The following relates to a wind turbine blade for a wind turbine and a wind turbine comprising such a wind turbine blade.

BACKGROUND

Modern wind turbine rotor blades are built from fiber-reinforced plastics. A rotor blade typically comprises an airfoil having a rounded leading edge and a sharp trailing edge. The rotor blade is connected with its blade root to a hub of the wind turbine. Further, the rotor blade is connected to the hub by means of a pitch bearing that allows a pitch movement of the rotor blade. Long rotor blades experience high wind forces.

Rotor blades may be made of two half-shells connected to each other. Further, a web, in particular a shear web, may be arranged between the two half-shells to reinforce the rotor blade. The shear web may be arranged between two beams or spar caps and may be connected thereto. The shear web, beams, and/or spar caps may extend in a longitudinal direction of the wind turbine blade and may comprise carbon fibers.

Rotor blades are the most exposed part of the wind turbine with respect to lightning strikes. Therefore, lightning protection systems (LPS) may be provided. A lightning protection system may comprise an electrical down conductor which may be connected to the web and which may extend along a longitudinal direction of the web. The down conductor may be electrically connected to a grounding system of the wind turbine blade. Further, receptors may be arranged along a blade surface and electrically connected to the down conductor. When a lightning strike is intercepted by the receptors, the electrical current is transferred to the grounding system by means of the down conductor.

EP 2 930 355 A1 shows a wind turbine blade having a carbon beam, an electrical conductor and copper meshes which electrically connect the electrical conductor to the carbon beam.

SUMMARY

An aspect relates to provide an improved wind turbine blade.

Accordingly, a wind turbine blade for a wind turbine, the wind turbine blade comprising a support element having first fibers being electrically conductive, and a fiber material having second fibers being electrically conductive, wherein the fiber material has a free portion and an overlapping portion which is at least partially attached and electrically connected to the support element, wherein an extension direction of the second fibers changes along an extension path of the second fibers, wherein a first angle is provided between the second fibers in the overlapping portion and the first fibers, wherein a second angle is provided between the second fibers in the free portion and the first fibers, and wherein the second angle is larger than the first angle.

The inventor found out that material transitions form critical points when current is conducted from one material to another material. These critical points may arise due to different conductivities or different conductivity anisotropies of the materials in the overlapping portion. The proposed overlapping portion between the support element and the fiber material avoids arcing or sparking and, thus, delamination in the support element when conducting a current, for example, having 86 kA. Thus, damages of the wind turbine blade may be avoided when a lightning strike is intercepted by the wind turbine blade.

An electrical conductivity discontinuity in the overlapping portion, in particular an attachment and/or joint surface between the overlapping portion and the support element, is decreased. This means that anisotropic electrical conductivities of the support element and the fiber material are adapted to each other. Thus, the current transfer through the attachment and/or joint surface is improved. The effect may be a reduction of the conductivity anisotropy in the attachment and/or joint surface since the conductivity along the extension direction or path of the fibers is much higher compared to other directions.

This may mean a reduction of the electrical resistance in the overlapping portion, in particular the attachment and/or joint surface between the overlapping portion and the support element, compared to a state in which the extension direction of the second fibers do not change along the extension path of the second fibers. Further, this may mean that in the overlapping portion, in particular the attachment and/or joint surface between the overlapping portion and the support element, electrical arcing may be reduced or avoided.

The first angle between the first fibers and the second fibers is reduced in the overlapping portion compared to the second angle in the free portion. The free portion and the overlapping portion are one piece. In particular, the overlapping portion may be completely attached and electrically connected to the support element. In particular, the support element comprises a fiber reinforced beam, in particular comprising composite material having carbon fibers and a resin, wherein the carbon fibers are electrically conductive.

The support element has a length which is at least 20, 30, 40, 50, 60, 70, 80 or 90% of a length of the wind turbine blade and is, for example, a support structure of the wind turbine blade which is configured to prevent kinking or buckling of the wind turbine blade. Further, excessive bending of the wind turbine blade and, thus, collisions with the tower may be avoided since stiffens is increased by means of the support element. The length of the wind turbine blade may be between 40 and 125 m, 40 and 90, or 40 and 70 m. Preferably, an electrical conductivity of the support element is anisotropic and, for example, different regarding all directions in space.

The first fibers are formed by a plurality of first fibers or fiber bundles which, for example, are emended in a matrix and which, for example, are arranged parallel and in particular continuous. In particular, the first fibers are carbon fibers. The support element comprises a rectangular or trapezoidal cross-section having a broad side and narrow side. Other shapes of the cross-section may be also possible. In particular, the support element is a flat element.

The fiber material is, for example, a flat material having the second fibers which, for example, are formed by a plurality of second fibers or fiber bundles which are arranged parallel. The fiber material overlaps with the support element and is attached thereto forming the overlapping portion. An electrical conductivity of the fiber material is anisotropic and, for example, different regarding all directions in space. An adjustment of the second fibers is referred to a top view and/or a view perpendicular on the broad side of the support element. The extension direction of the second fibers is adjusted such that the second fibers change an orientation along the extension path of the second fibers. The extension direction of the second fibers changes such that the first angle is reduced.

This means, for example, that the second angle between the first fibers and the second fibers is reduced along the extension path of the second fibers towards the support element. The second fibers are steered into the support element and align with the first fibers. This has the advantage that an implementation in the wind turbine blades is simplified for butterfly and integral blades.

According to an embodiment, the first angle is between 0 and 50°, 0 and 35°, 0 and 20° or 0 and 10°, in particular 0°.

Thus, the second fibers, for example, can align with the first fibers. The attaching and/or joint surface between the overlapping portion and the support element starts in the overlapping portion where the fiber material is already totally steered, in particular where the first angle is 0°. For example, the attaching and/or joint surface between the overlapping portion and the support element is only provided in the overlapping portion where the first angle is 0°. Thus, an effective electrical connection may be provided.

According to a further embodiment, the second angle between the first fibers and the second fibers is reduced continuously in the free portion towards the overlapping portion.

The first angle is reduced towards an end of the fiber material which overlaps with the support element. In particular, the first angle and/or the second angle is only reduced, i.e. not increased, towards the end of the fiber material. In particular, the second fibers are not arranged sinuously or provided as serpentine fibers. "Continuously" means, in particular, without sharp kinks.

According to a further embodiment, the second fibers are arc-shaped when looking perpendicularly on a broad side of the support element.

In particular, the fiber material is arc-shaped when looking perpendicularly on a broad side of the support element. For example, the broad side is the broadest side of the support element. The second fibers are merely single-curved, i.e. bended only around one direction and not meander-shaped. The second fibers are arc-shaped for aligning with the first fibers.

According to a further embodiment, the fiber material comprises a weft thread extending wavelike along the extension direction of the second fibers for holding-together the second fibers.

This means that the weft thread is provided wavelike and, additionally, arc-shaped. Weft threads bundle the second fibers together. In particular, the weft threads are provided as at least one fiber bundle, in particular carbon fiber bundle or glass fiber bundle. Alternatively, the fiber bundle may comprise polyester or urethane.

According to a further embodiment, the first fibers are unidirectional carbon fibers and/or wherein the second fibers are unidirectional carbon fibers.

The first fibers and the second fibers are provided as fibers or fiber bundles of an identical type. Therefore, the conductivities in the overlapping portion can be equaled at least in one direction. The fiber material does not comprise randomly distributed short fibers. In particular, the fiber material and the support element are made from the same material.

According to a further embodiment, the support element is a spar cap comprising carbon fiber reinforced polymer material and/or the fiber material is a carbon fiber steered mat.

In particular, the spar cap is connected to the blade shell and/or connected to a shear web. The carbon fiber steered mat is arc-shaped when looking on a flat side of the steered mat.

According to a further embodiment, the wind turbine blade further comprises an electrical conductor, wherein the fiber material has a further overlapping portion which is attached and electrically connected to the electrical conductor, wherein the second fibers extend from the further overlapping portion towards the overlapping portion.

This has the advantage that a reliable electrical connection between the electrical conductor and the support element may be provided since the fiber material is non-stop electrical conductive due to the second fibers. The further overlapping portion is an overlapping portion between the fiber material and the electrical conductor. In particular, the electrical connection between the support element and the electrical conductor is provided without copper or copper meshes, in particular without metal. The wind turbine blade comprises receptors for lightning strikes. In particular, the receptors are electrically connected to the electrical conductor.

The electrical conductor has a distance to the support element and, thus, is electrically connected to the support element merely by means of the fiber material or several of such fiber materials. Therefore, the further overlapping portion which tends more to arcing and sparking due to different conductivity properties has a distance to the support element. Thus, the support element is protected. Furthermore, failures in the further connection are more likely to be detected and repaired prior to a collapse of the structure. Moreover, the further connection may be designed to withstand to arcing and sparking.

According to a further embodiment, the electrical conductor comprises an extension direction, wherein an angle between the second fibers and the extension direction of the electrical conductor in the further overlapping portion is between 0 and 90°, 30 and 90°, 45 and 90°, 60 and 90°, or 75 and 90°, in particular 90°.

According to a further embodiment, the fiber material is warped or folded around the electrical conductor.

This has the advantage that sufficient attaching surface between the fiber material and the electrical conductor may be provided. Thus, arcing in the further connection portion and adjacent thereto may be avoided or reduced.

According to a further embodiment, the wind turbine blade further comprises a further electrical conductor and a further fiber material, wherein the further fiber material is attached and electrically connected to the support element and the further electrical conductor or the electrical conductor.

The further fiber material and the fiber material are of an identical type. In particular, the further fiber material is connected to the further electrical conductor as described for the fiber material and the electrical conductor forming a second electrical connection to the support element.

Three or more of such fiber materials and such electrical conductors may be provided. The electrical conductor and the further electrical conductor may be provided as one electrical conductor extending in longitudinal direction of the wind turbine blade. Thus, it is possible to increase the number of connections between the support element and the electrical conductors or conductor providing a redundant system.

According to a further embodiment, the electrical conductor and the fiber material are arranged at a blade root and the further electrical conductor and the further fiber material are arranged at a blade tip.

A third fiber material is—as the fiber material—connected to the support element and a third electrical conductor, wherein the third fiber material and the third electrical conductor are arranged between the fiber material and the further fiber material.

According to a further embodiment, the overlapping portion is sandwiched between the further fiber material and the support element.

In particular, the fiber material and the further fiber material have a curved shape having different radii.

According to a further embodiment, the electrical conductor and/or the further electrical conductor is a metal cable.

The electrical conductor preferably is a braided cable or a metal stripe. In particular, the electrical conductor comprises aluminum, copper, steel and/or titanium. The electrical conductor has a rectangular cross-section and/or a flat cross-section.

Further, a wind turbine comprising such a wind turbine blade is provided.

Wind turbine presently refers to an apparatus converting the wind's kinetic energy into rotational energy, which may again be converted to electrical energy by the apparatus. The wind turbine comprises three or four of such wind turbine blades.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with reference to the following figures, wherein like designations denote like members, wherein:

FIG. 7 shows schematically a perspective view of a further embodiment of the connecting arrangement;

FIG. 8 shows schematically a cross-sectional view VIII-VIII from FIG. 7; and

FIG. 9 shows schematically a perspective view of a further embodiment of the connecting arrangement.

In the Figures, like reference numerals designate like or functionally equivalent elements, unless otherwise indicated.

DETAILED DESCRIPTION

Figure 1:
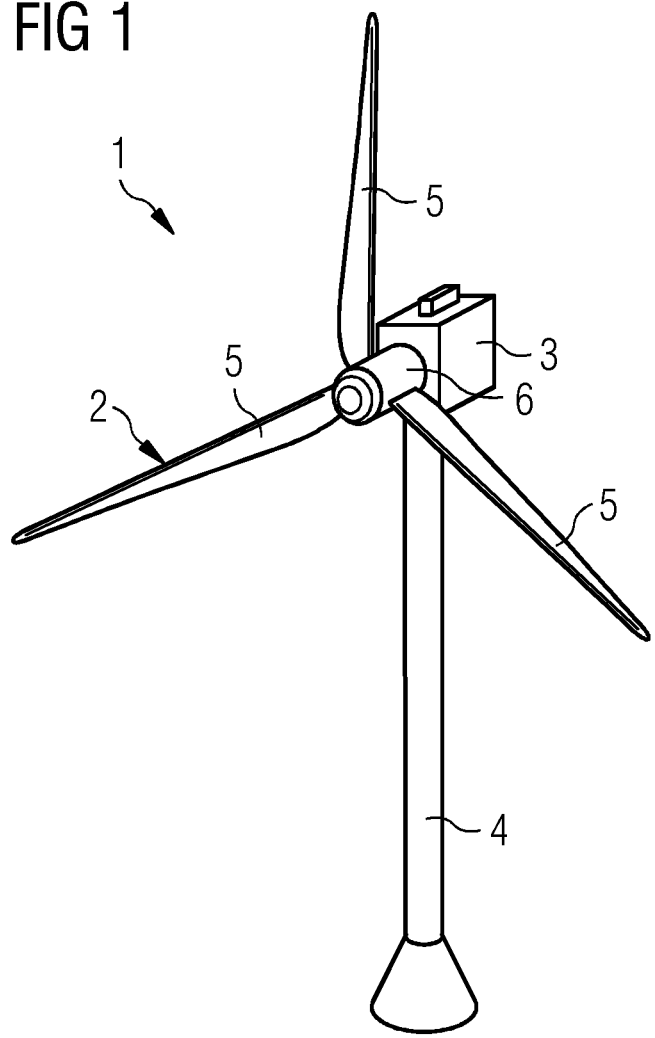
FIG. 1 shows a perspective view of a wind turbine according to one embodiment.

FIG. 1 shows a wind turbine 1. The wind turbine 1 comprises a rotor 2 connected to a generator (not shown) arranged inside a nacelle 3. The nacelle 3 is arranged at an upper end of a tower 4 of the wind turbine 1.

The rotor 2 comprises three wind turbine blades 5. The wind turbine blades 5 are connected to a hub 6 of the wind turbine 1. Rotors 2 of this kind may have diameters ranging from, for example, 30 to 200 meters or even more. The wind turbine blades 5 are subjected to high wind loads. At the same time, the wind turbine blades 5 need to be lightweight. For these reasons, wind turbine blades 5 in modern wind turbines 1 are manufactured from fiber-reinforced composite materials. Oftentimes, glass or carbon fibers in the form of unidirectional fiber mats are used.

Figure 2:
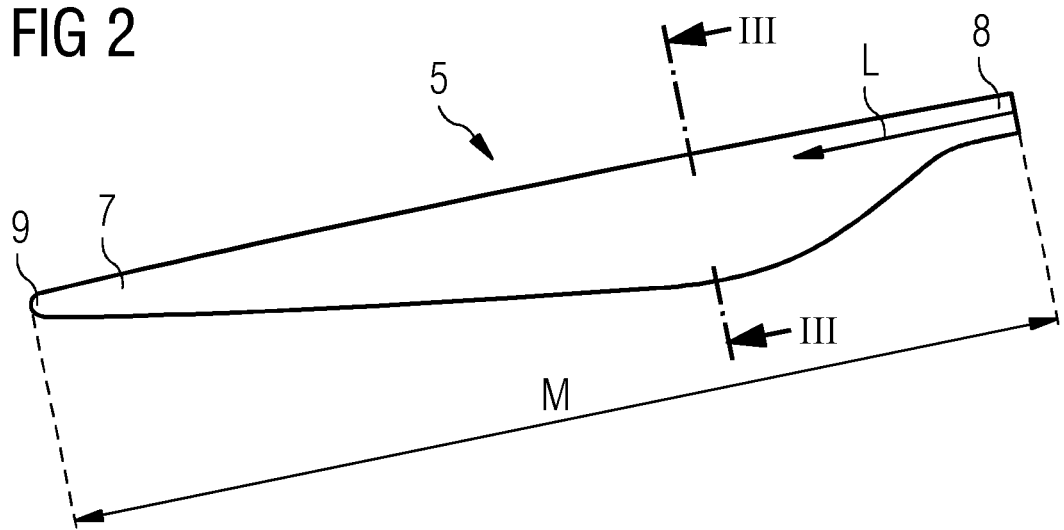
FIG. 2 shows a perspective view of a wind turbine blade of the wind turbine according to FIG. 1.

FIG. 2 shows a wind turbine blade 5. The wind turbine blade 5 comprises an aerodynamically designed portion 7 which is shaped for optimum exploitation of the wind energy and a blade root 8 for connecting the wind turbine blade 5 to the hub 6. Further, the wind turbine blade 5 comprises a blade tip 9, wherein the blade root 8 and the blade tip 9 face opposite sides. The wind turbine blade 5 extends in a longitudinal direction L. The blade 5 has a length M which, for example, may be between 15 to 125 m.

Figure 3:
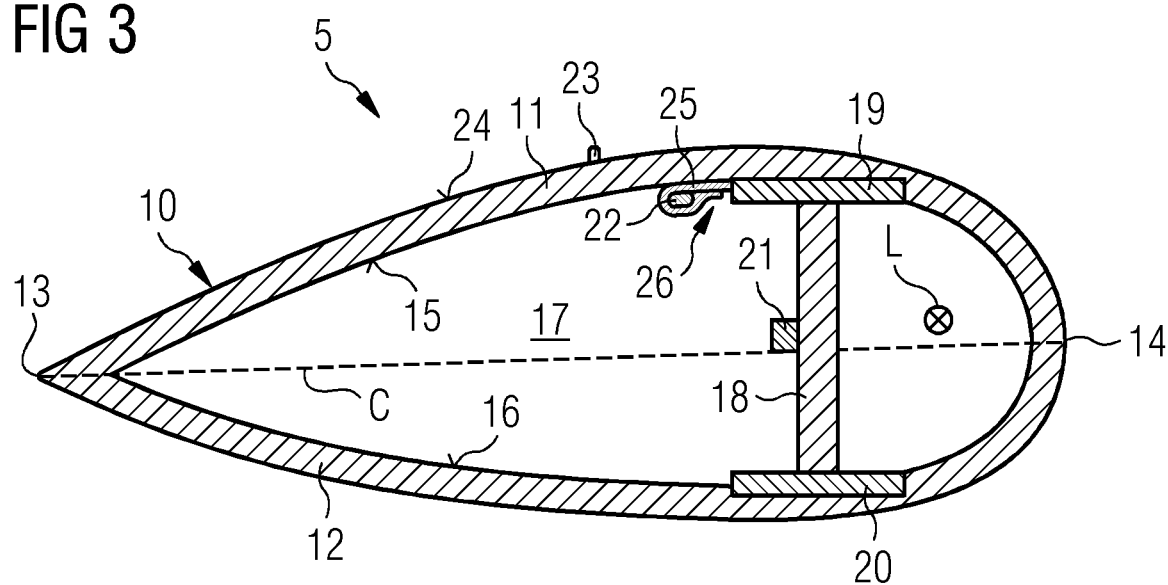
FIG. 3 shows schematically a cross-sectional view III-III from FIG. 2.

FIG. 3 shows schematically a cross-sectional view III-III from FIG. 2. All elements shown in FIG. 3 are shown simplified. It is understood that intermediate elements, in particular further connecting elements, reinforcement elements and shells, may be provided.

The wind turbine blade 5 comprises an outer blade shell 10 comprising a first half-shell 11 and a second half-shell 12 which are connected together at one side 13 of the wind turbine blade 5, in particular at a trailing edge, and at the other side 14 of the wind turbine blade 5, in particular at a leading edge, to form the outer shell 10 of the wind turbine blade 5.

A chord line C intersects the trailing edge and the leading edge. The blade shell 10 may comprise composite fiber material. Further, the first half-shell 11 and the second half-shell 12 may be adhesively bonded together. Alternatively, the blade shell 10 may be provided as a one-piece element. The first half-shell 11 comprises an inner surface 15 and the second half-shell 12 comprises an inner surface 16 being opposite to each other, wherein an inner space 17 of the wind turbine blade 5 is defined by the inner surfaces 15, 16.

A web 18, in particular a shear web, is located inside the inner space 17 extending from the inner surface 15 of the first half-shell 11 to the inner surface 16 of the second half-shell 12. The wind turbine blade 5 further comprises a support element 19, in particular a first carbon fiber reinforced beam and/or spar cap, connected to the first half-shell 11 and a support element 20, in particular a second carbon beam and/or spar cap, connected to the second half-shell 12.

In particular, the support elements 19, 20 are electrically conductive and extend along the longitudinal direction L. The web 18 also extends along the longitudinal direction L.

The web 18 is located between the support element 19 and the support element 20, wherein the web 18 and the support elements 19, 20 are forming an I-shaped cross section. The web 18 and the support elements 19, 20 are forming a support structure preventing breaking or crippling of the wind turbine blade 5. Alternatively, or additionally, the support element 19, 20 may be provided near to the trailing edge or near to the leading edge of the wind turbine blade 5.

Further, a lightning conductor 21 is provided extending along the longitudinal direction L and being attached to the web 18. The lightning conductor 21 is arranged between the support elements 19, 20. The lightning conductor 21 is a down conductor. In particular, the lightning conductor 21 is a metal cable. Further, the lightning conductor 21 is grounded.

Further, an electrical conductor 22 extending in the longitudinal direction L is provided inside the inner space 17. The electrical conductor 22 is connected to the inner surface 15. In particular, a receptor 23 (lighting rod or air terminal) is arranged at an outer surface 24 of the blade 5. The receptor 23 is directly or indirectly electrically connected to the electrical conductor 22 and the lightning conductor 21 (connection not shown). The electrical conductor 22 is directly connected and/or connected by means of a further cable to the lighting conductor 21 (not shown).

A plurality of receptors 23 may be provided at the outer surface 24. The receptors 23 and the conductor 21 form a lightning protection system. Further, a fiber material 25 being electrically conductive is provided. The fiber material 25 is attached and, thus, directly electrically connected to the electrical conductor 22.

The electrical conductor 22 is a metal (e.g. copper or aluminum) cable. Furthermore, the fiber material 25 is attached and, thus, directly electrically connected to the support element 19.

Figure 4:
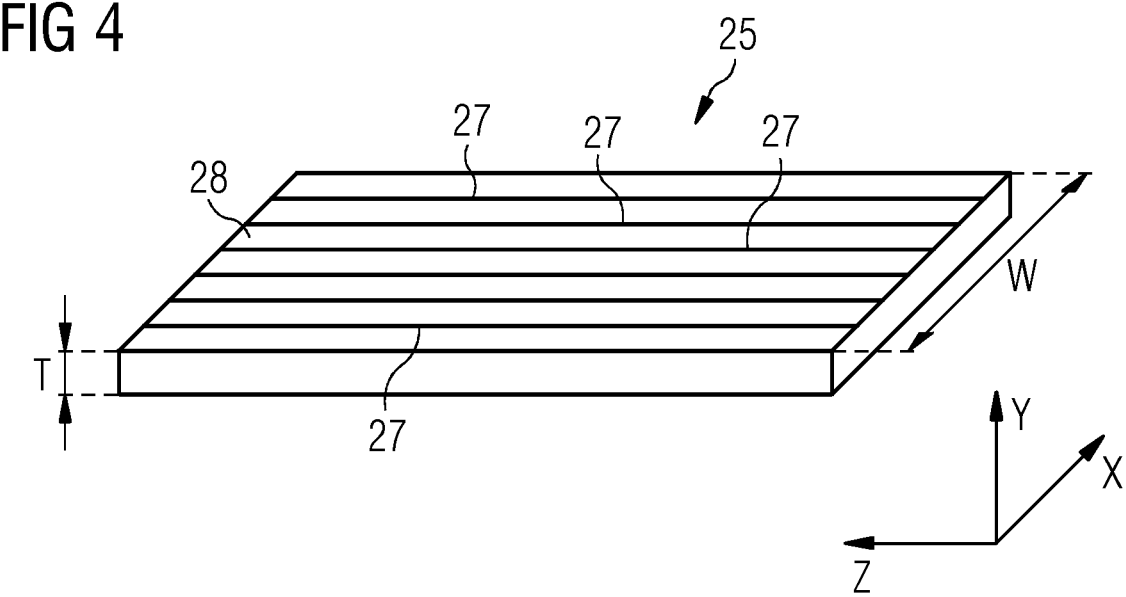
FIG. 4 shows schematically a perspective view of a fiber material.

FIG. 4 shows schematically a perspective view of the fiber material 25. The fiber material 25 comprises a plurality of fibers 27 (also referred as second fibers). In particular, the fibers 27 are unidirectional and, in particular, continuous carbon fibers. The fibers 27 are embedded in a matrix 28, for example plastic material, in particular resin. The fibers 27 extend parallel to a direction Z which is perpendicular to a direction X and a direction Y. Further, the fibers 27 run straight. Each fiber 27 may be a single fiber or a fiber bundle. A thickness T of the fiber material 25 extends in the direction Y. A width W of the fiber material 25 extends in the direction X.

An electrical conductivity matrix $\sigma_{CFC}$ of such a fiber material 25 is in particular:

$$\sigma_{CFC} = \begin{pmatrix} 88 & 0 & 0 \\ 0 & 15 & 0 \\ 0 & 0 & 24000 \end{pmatrix} S/m$$

The electrical conductivity is indicated in Siemens (S) per Meter (m). As shown above the conductivity in the direction Z which is the extension direction of the carbon fibers 27 is many times larger than the conductivities in the direction X and the direction Y. This illustrates an anisotropy of the fiber material 25. The fibers 27 are the main reason for a sufficient electrical conductivity of the fiber material 25. The conductivity in the direction Z is between 20000 and 30000 S/m.

Figure 5:
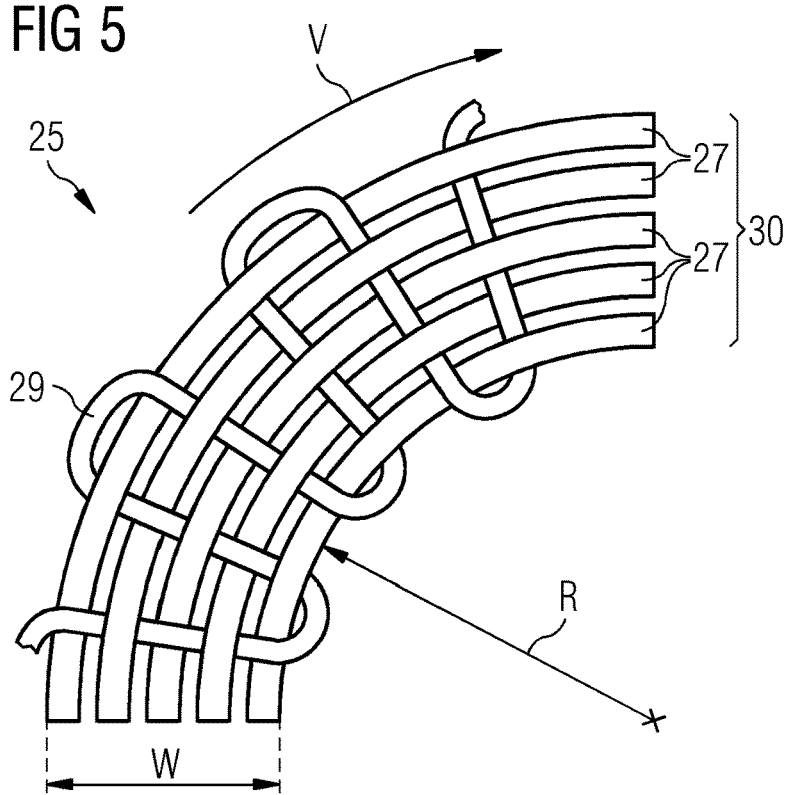
FIG. 5 shows schematically a top view of a steered fiber material.

FIG. 5 shows schematically a top view of the fiber material 25 which—in this embodiment—is provided as a steered fiber material. In particular, this means that the fibers 27 are curved having a curve radius R, in particular between 100 and 1000 mm.

The fibers 27 are, for example, warp threads. The fiber material 25 further comprises at least one weft thread 29 extending wavelike along the curved shape of the fibers 27 for holding-together or bundle the fibers 27. The weft threads 29 are threaded perpendicularly through the fibers 27. The at least one weft thread 29 comprises glass fibers or is a glass fiber bundle. Alternatively, the at least one weft thread 29 comprises carbon fibers or is a carbon fiber bundle. In particular, the weft thread 29 is electrically conductive.

The weft threads 29 are also provided in the fiber material shown in FIG. 4. Therefore, the electrical conductivity in the direction X is greater than in the direction Y (see FIG. 4). A plurality 30 of fibers 27 is arranged side by side forming a curved main extension direction V of the fiber material 25. By curving the plurality 30 of fibers 27, a curved path having sufficient electrical conductivity along the curved path can be provided. The fibers 27 are curved and are the main reason for a sufficient electrical conductivity. The conductivity in the direction V of the fiber material 25 is between 20000 and 30000 S/m.

Figure 6:
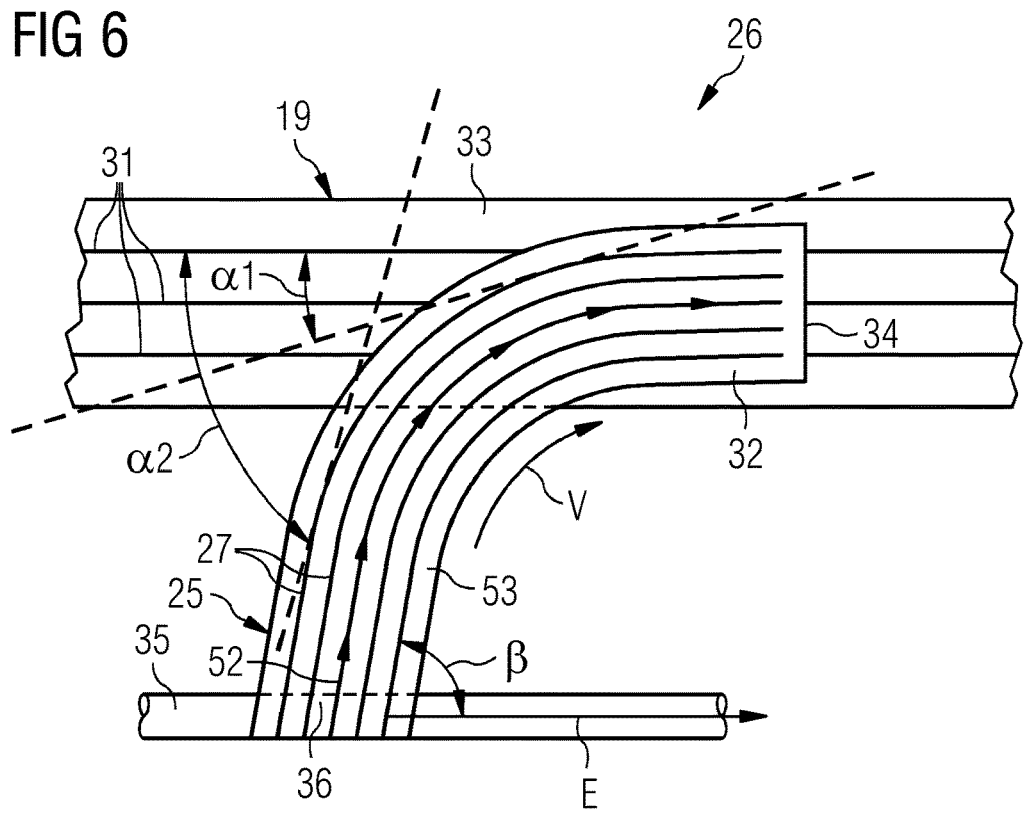
FIG. 6 shows schematically a top view of a connecting arrangement of the wind turbine blade according to FIG. 2.

FIG. 6 shows schematically a top view of a connecting arrangement 26 of the wind turbine blade 5 according to FIG. 2. The connecting arrangement 26 comprises the support element 19 having fibers 31 (also referred as first fibers) being electrically conductive, and the fiber material 25 having the fibers 27 being electrically conductive. The fiber material 25 is attached and electrically connected to the support element 19 forming an overlapping portion 32. The fibers 27 extend towards the support element 19 and the extension direction V of the fibers 27 is adjusted—when looking from a top view and/or when looking perpendicularly on a broad side 33 of the support element 19—such that an electrical conductivity discontinuity through the overlapping portion 32 is reduced.

In particular, the extension direction V of the fibers 27 changes such that an angle α1 (also referred as first angle) between the fibers 31 in the overlapping portion 32 and the fibers 27 is reduced. For example, the angle α1 in the overlapping portion 32 is between 0 and 50°, 0 and 35°, 0 and 20° or 0 and 10°, in particular 0°. This means that the angle α1 between the fibers 31 and the fibers 27 is reduced along an extension path 52 of the fibers 27 towards the support element 19. The angle α1 decreases, in particular continuously, along the extension direction V towards an end 34 of the fiber material 25 which overlaps with the support element 19. Alternatively, the fibers 27 may be kinked having a distinct kink (not shown).

Further, the fiber material 25 has a free portion 53 which is directly connected to the overlapping portion 32. The extension direction V of the second fibers 27 changes along the extension path 52 of the second fibers 27. An angle α2 (also referred as second angle is provided between the second fibers 27 in the free portion 53 and the first fibers 31. The angle α2 is larger than the angle α1.

The arrangement 26 further comprises an electrical conductor 35, wherein the fiber material 25 is attached and electrically connected to the electrical conductor 35 forming a further overlapping portion 36 which is directly connected to the free portion 53. The free portion 53, the overlapping portion 32 and the further overlapping portion 36 are one-piece. The fibers 27 extend from the further overlapping portion 36 to the overlapping portion 32.

For example, the electrical conductor 35 may be the electrical conductor 22 from FIG. 3. The fibers 27 extend from the further overlapping portion 36 towards the overlapping portion 32. As shown in FIG. 6, the overlapping portion 32 overlaps with the support element 19 and the further overlapping portion 36 overlaps with the electrical conductor 35. In particular, the electrical conductor 35 is a metal cable. For example, the angle α2 is reduced continuously from the further overlapping portion 36 towards the overlapping portion 32.

In particular, the second fibers 27 and the fiber material 25 are arc-shaped when looking perpendicularly on the broad side 33 of the support element 19. The fibers 27 are single-curved. The electrical conductor 35 comprises an extension direction E. An angle β between the fibers 27 and the extension direction E of the electrical conductor 35 in the further overlapping portion 36 is between 0 and 90°, 30 and 90°, 45 and 90°, 60 and 90°, or 75 and 90°, in particular 90°. In particular, the fibers 31 are unidirectional carbon fibers and the fibers 27 are unidirectional carbon fibers.

The fibers 31 and the fibers 27 are of an identical type having the same electrical conductivity. This has the advantage that the impedance of the support element 19 and the fiber material 25 is in the same range and thus current is transferred homogenous, i.e. not mainly at the edges of the connection, from the fiber material 25 to the carbon element 19. The fiber material 25 and the support element 19 are made from the same material.

FIG. 7 shows schematically a perspective view of a further embodiment of the connecting arrangement 26. The support element 19 is a spar cap comprising carbon fiber reinforced polymer material (CFRP).

In contrast to FIG. 6 the arrangement 26 comprises an electrical conductor 37 (also referred as further electrical conductor) and a fiber material 38 (also referred as further fiber material), wherein the fiber material 38 is attached and electrically connected to the support element 19 and the electrical conductor 37. The electrical conductor 35 and the fiber material 25 are arranged near to the blade root 8 (see FIG. 2) and the electrical conductor 37 and the fiber material 38 are arranged near to the blade tip 9 (see FIG. 2).

The fiber material 38 is mirror symmetrically arranged regarding fiber material 25. An end portion 40 of the support element 19 is wedge-shaped. The overlapping portion 32 is provided at the end portion 40. In particular, another end portion 41 of the support element 19 is also wedge-shaped. The fiber material 38 is connected to the other end portion 41.

Moreover, an electrical conductor 39 and a fiber material 42 are provided. The fiber material 42 is attached and electrically connected to the support element 19 and the electrical conductor 39. The electrical conductor 39 and the fiber material 42 are provided as mid connection arranged between the fiber material 25 and the fiber material 38. The electrical conductor 35, the electrical conductor 37 and the electrical conductor 39 may be provided as a one-piece conductor, in particular a LPS-cable and/or the conductor 22 (see FIG. 3). Alternatively, the conductors 35, 37, 39 may be provided as separate conductors, in particular LPS-cables.

The fiber materials 38, 42 may be connected to the support element 19 as described for fiber material 25. The broad side 33 may be provided as broadest side of the support element 19. The support element 19 further comprises a narrow side 43, wherein the broad side 33 is several times larger than the narrow side. Thus, the support element 19 is provided as a flat element. The support element 19 has a rectangular cross-sectional shape.

Optionally, a core insert 44 may be provided which is attached to the narrow side 43. The electrical conductor 39 is arranged in a plane P which is provided parallel and offset to the broad side 33. In particular, the core insert 44 provides a rounded transition between broad side 33 and the plane P.

The core insert 44 is provided over the complete length of the support element 19. The electrical conductors 37, 39 are connected to the fiber materials 38, 42 as described for the electrical conductor 35 and the fiber material 25. In particular, the support element 19 has a conductivity between 20000 and 30000 S/m, in particular 24000 S/m, in longitudinal direction L.

FIG. 8 shows schematically cross-sectional view VIII-VIII from FIG. 7 which shows a connection 45 between the electrical conductor 39 and the fiber material 42, in particular the further overlapping portion 36. The fiber material 42 is warped or folded around the electrical conductor 39. The fiber material 42 encompasses the electrical conductor 39, wherein an end portion 46 of the fiber material 42 overlaps with an intermediate portion 47 of the fiber material 42 which extend towards the electrical conductor 39.

Alternatively, the fiber material 42 may be warped around the electrical conductor 39 without forming an overlapping portion.

FIG. 9 shows schematically a further embodiment of the connecting arrangement 26. In contrast to FIG. 7, the electrical conductor 35 is electrically connected to the support element 19 by means of two fiber materials 25, 48 having different radii R. Therefore, a redundant connection between the electrical conductor 35 and the support element 19, in particular the end portion 40 may be provided.

The fiber material 48 comprises fibers 49 which are provided as described for fibers 27. The fiber material 48 is attached and electrically connected to the overlapping portion 32 by means of an overlapping portion 50 which overlaps with the overlapping portion 32. In particular, the fiber material 48 is also attached to the support element 19.

Further, the fiber material 48 is attached and electrically connected to the electrical conductor 35 forming an overlapping portion 51. The overlapping portion 32 is sandwiched between the support element 19, in particular the end portion 40, and the fiber material 48, in particular the overlapping portion 50. The overlapping portion 51 is provided as described for overlapping portion 36. The overlapping portions 36, 51 are provided side by side along the direction E.

For example, every fiber material 25, 38, 27 shown in FIG. 7 may be substituted by two fiber materials 25, 48 as shown in FIG. 9. Alternatively, all fiber materials 25, 38, 27 shown in FIG. 7 may be substituted by merely two fiber materials 25, 48 as shown in FIG. 9.

The fiber materials 25, 38, 42, 48 may be provided as described regarding FIGS. 5, 6 and/or 9. The connection portions 36, 51 between the conductors 35, 37, 39 and the fiber materials 25, 38, 42, 48 may be provided as described regarding FIG. 8. The electrical conductivities explained with regard to FIG. 4 apply mutatis mutandis to all fiber materials 25, 38, 42, 48.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine blade for a wind turbine, the wind turbine blade comprising a support element having first fibers being electrically conductive, and a fiber material having second fibers being electrically conductive, wherein the fiber material has a free portion and an overlapping portion which is at least partially attached and electrically connected to the support element, wherein an extension direction of the second fibers changes along an extension path of the second fibers, wherein a first angle is provided between the second fibers in the overlapping portion and the first fibers, wherein a second angle is provided between the second fibers in the free portion and the first fibers, wherein the second angle is larger than the first angle (α1), and wherein at least one of the first fibers and the second fibers are unidirectional carbon fibers.

2. The wind turbine blade according to claim 1, wherein the first angle is between 0 and 50°, between 0 and 35°, between 0 and 20°, between 0 and 10°, or equal to 0°.

3. The wind turbine blade according to claim 1, wherein the second angle between the first fibers and the second fibers is reduced continuously in the free portion towards the overlapping portion.

4. The wind turbine blade according to claim 1, wherein the second fibers are arc-shaped when looking perpendicularly on a broad side of the support element.

5. The wind turbine blade according to claim 1, wherein the fiber material comprises a weft thread extending wavelike along the extension direction of the second fibers for holding-together the second fibers.

6. The wind turbine blade according to claim 1, wherein at least one of the support element is a spar cap comprising carbon fiber reinforced polymer material and the fiber material is a carbon fiber steered mat.

7. The wind turbine blade according to claim 1, further comprising an electrical conductor, wherein the fiber material has a further overlapping portion which is attached and electrically connected to the electrical conductor, wherein the second fibers extend from the further overlapping portion towards the overlapping portion.

8. The wind turbine blade according to claim 7, wherein the electrical conductor comprises an extension direction, and wherein an angle between the second fibers and the extension direction of the electrical conductor in the further overlapping portion is one of between 0 and 90°, between 30 and 90°, between 45 and 90°, between 60 and 90°, between 75 and 90°, or equal to 90°.

9. The wind turbine blade according to claim 7, wherein the fiber material is warped or folded around the electrical conductor.

10. The wind turbine blade according to claim 7, further comprising a further electrical conductor and a further fiber material, wherein the further fiber material is attached and electrically connected to the support element and the further electrical conductor or the electrical conductor.

11. The wind turbine blade according to claim 10, wherein the electrical conductor and the fiber material are arranged at a blade root and wherein the further electrical conductor and the further fiber material are arranged at a blade tip.

12. The wind turbine blade according to claim 10, wherein the overlapping portion is sandwiched between the further fiber material and the support element.

13. The wind turbine blade according to claim 10, wherein at least one of the electrical conductor and the further electrical conductor is a metal cable.

14. A wind turbine comprising the wind turbine blade according to claim 1.

15. A wind turbine blade for a wind turbine, the wind turbine blade comprising a support element having first fibers being electrically conductive, and a fiber material having second fibers being electrically conductive, wherein the fiber material has a free portion and an overlapping portion which is at least partially attached and electrically connected to the support element, wherein an extension direction of the second fibers changes along an extension path of the second fibers, wherein a first angle is provided between the second fibers in the overlapping portion and the first fibers, wherein a second angle is provided between the second fibers in the free portion and the first fibers, wherein the second angle is larger than the first angle (α1), and wherein the fiber material comprises a weft thread extending wavelike along the extension direction of the second fibers for holding-together the second fibers.

16. A wind turbine blade for a wind turbine, the wind turbine blade comprising a support element having first fibers being electrically conductive, and a fiber material having second fibers being electrically conductive, wherein the fiber material has a free portion and an overlapping portion which is at least partially attached and electrically connected to the support element, wherein an extension direction of the second fibers changes along an extension path of the second fibers, wherein a first angle is provided between the second fibers in the overlapping portion and the first fibers, wherein a second angle is provided between the second fibers in the free portion and the first fibers, wherein the second angle is larger than the first angle (α1), and wherein the fiber material is a carbon fiber steered mat.

* * * * *